(12) United States Patent
Ji et al.

(10) Patent No.: US 10,705,302 B2
(45) Date of Patent: Jul. 7, 2020

(54) PHOTONIC INTEGRATED CIRCUIT PACKAGES

(71) Applicant: SAMSUNG ELECTRONICS CO., LTD., Suwon-si, Gyeonggi-do (KR)

(72) Inventors: Ho Chul Ji, Seongnam-si (KR); Keun Yeong Cho, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/211,712

(22) Filed: Dec. 6, 2018

(65) Prior Publication Data
US 2019/0265421 A1 Aug. 29, 2019

Related U.S. Application Data

(60) Provisional application No. 62/635,878, filed on Feb. 27, 2018.

(30) Foreign Application Priority Data

Jul. 2, 2018 (KR) .................. 10-2018-0076473

(51) Int. Cl.
| | | |
|---|---|---|
| *G02B 6/42* | (2006.01) | |
| *G02B 6/43* | (2006.01) | |
| *G02B 6/124* | (2006.01) | |
| *G02B 6/12* | (2006.01) | |
| *G02B 6/30* | (2006.01) | |
| *G02B 6/34* | (2006.01) | |

(52) U.S. Cl.
CPC ....... *G02B 6/4214* (2013.01); *G02B 6/12002* (2013.01); *G02B 6/124* (2013.01); *G02B 6/30* (2013.01); *G02B 6/43* (2013.01); *G02B 6/12004* (2013.01); *G02B 6/34* (2013.01); *G02B 6/4249* (2013.01); *G02B 2006/12104* (2013.01); *G02B 2006/12107* (2013.01)

(58) Field of Classification Search
None
See application file for complete search history.

(56) References Cited

U.S. PATENT DOCUMENTS

| | | | | |
|---|---|---|---|---|
| 4,871,224 A | * | 10/1989 | Karstensen | G02B 6/43 385/14 |
| 4,966,430 A | * | 10/1990 | Weidel | G02B 6/2817 257/84 |
| 5,400,419 A | * | 3/1995 | Heinen | G02B 6/4246 385/14 |
| 5,835,646 A | * | 11/1998 | Yoshimura | G02B 6/262 385/14 |

(Continued)

FOREIGN PATENT DOCUMENTS

| | | |
|---|---|---|
| JP | 2015-031814 A | 2/2015 |
| KR | 10-2017-0053553 A | 5/2017 |

*Primary Examiner* — Michelle R Connelly
(74) *Attorney, Agent, or Firm* — Lee IP Law, P.C.

(57) ABSTRACT

A photonic integrated circuit package includes a first substrate including a first mirror and an optical coupling device spaced apart from each other, and a second substrate on an upper portion of the first substrate, the second substrate including an electro-optical converter and a second mirror, the electro-optical converter to output an optical signal to the first mirror, and the second mirror to reflect an optical signal reflected by and received from the first mirror to the optical coupling device.

19 Claims, 14 Drawing Sheets

(56) References Cited

U.S. PATENT DOCUMENTS

| | | | | |
|---|---|---|---|---|
| 6,845,184 B1* | 1/2005 | Yoshimura | G02B 6/12002 | 385/14 |
| 7,680,367 B2* | 3/2010 | Matsuoka | G02B 6/43 | 385/129 |
| 7,703,993 B1 | 4/2010 | Darbinyan et al. | | |
| 7,869,671 B2* | 1/2011 | Ishida | G02B 6/12002 | 385/129 |
| 7,945,131 B1* | 5/2011 | Asghari | G02B 6/12002 | 359/333 |
| 8,090,231 B1* | 1/2012 | Asghari | G02B 6/43 | 385/39 |
| 8,422,836 B2* | 4/2013 | Riester | G02B 6/138 | 385/14 |
| 9,028,157 B2 | 5/2015 | Na et al. | | |
| 9,099,581 B2 | 8/2015 | Na et al. | | |
| 9,244,231 B2 | 1/2016 | Arimoto et al. | | |
| 9,692,202 B2* | 6/2017 | Behfar | H01S 5/0071 | |
| 9,762,026 B2 | 9/2017 | Tamura et al. | | |
| 9,804,334 B2* | 10/2017 | Israel | G02B 6/262 | |
| 9,964,702 B1* | 5/2018 | Luo | G02B 6/12004 | |
| 10,146,020 B1* | 12/2018 | Yasumura | G02B 6/29316 | |
| 10,209,442 B2* | 2/2019 | Menezo | G02B 6/12002 | |
| 10,345,524 B2* | 7/2019 | Jiang | G02B 6/14 | |
| 10,459,163 B2* | 10/2019 | Menezo | G02B 6/13 | |
| 10,481,334 B2* | 11/2019 | Israel | G02B 6/3692 | |
| 2002/0028045 A1* | 3/2002 | Yoshimura | G02B 6/10 | 385/50 |
| 2002/0039464 A1* | 4/2002 | Yoshimura | G02B 6/10 | 385/14 |
| 2006/0018588 A1* | 1/2006 | Uchida | H05K 1/0274 | 385/14 |
| 2007/0137254 A1* | 6/2007 | Fukuzawa | G02B 6/125 | 65/386 |
| 2011/0299808 A1* | 12/2011 | Matsuoka | G02B 6/4214 | 385/14 |
| 2012/0057822 A1* | 3/2012 | Wu | G02B 6/136 | 385/49 |
| 2014/0177995 A1* | 6/2014 | Mohammed | G02B 6/36 | 385/14 |
| 2015/0155423 A1* | 6/2015 | Matsuoka | G02B 6/4259 | 438/69 |
| 2016/0131848 A1* | 5/2016 | Svilans | G02B 6/12004 | 385/14 |
| 2017/0102503 A1 | 4/2017 | Israel et al. | | |
| 2017/0261704 A1* | 9/2017 | Doany | G02B 6/124 | |
| 2018/0045891 A1* | 2/2018 | Israel | G02B 6/262 | |
| 2018/0106964 A1* | 4/2018 | Luo | G02B 6/12004 | |
| 2018/0335566 A1* | 11/2018 | Menezo | G02B 6/12002 | |
| 2018/0335575 A1* | 11/2018 | Gudeman | G02B 6/3652 | |
| 2019/0033542 A1* | 1/2019 | Epitaux | G02B 6/4214 | |
| 2019/0036295 A1* | 1/2019 | Arimoto | H01S 5/12 | |
| 2019/0049677 A1* | 2/2019 | Yasumura | G02B 6/4214 | |
| 2019/0113699 A1* | 4/2019 | Mack | G02B 6/4286 | |
| 2019/0137705 A1* | 5/2019 | Vallance | G02B 6/4214 | |
| 2019/0170937 A1* | 6/2019 | Menezo | G02B 6/30 | |

* cited by examiner

X-X'

PHOTONIC INTEGRATED CIRCUIT PACKAGES

CROSS-REFERENCE TO RELATED APPLICATIONS

This U.S. Non-Provisional application claims priority under 35 USC § 119 to U.S. Provisional Application No. 62/635,878 filed on Feb. 27, 2018, in the USPTO and to Korean Patent Application No. 10-2018-0076473 filed on Jul. 2, 2018, in the Korean Intellectual Property Office, and entitled: "Photonic Integrated Circuit Packages," is incorporated by reference herein in its entirety.

BACKGROUND

1. Field

The present disclosure relates to photonic integrated circuit packages.

2. Description of the Related Art

There is a growing demand for the high-speed transmission and reception of large amounts of data in electronic devices. Accordingly, research into replacing signal transfers through conventional metal wirings with a signal transfer method using an optical signal has been actively conducted. In the signal transfer system using an optical signal, a photonic integrated circuit package, in which a light source and an optical coupling device are integrated, is required. Thus, there is a need for a structure for accurate transfer of light between components within such a photonic integrated circuit package.

SUMMARY

According to an aspect of the present disclosure, a photonic integrated circuit package includes a first substrate in which a first mirror and an optical coupling device disposed to be spaced apart from the first mirror are disposed, and a second substrate disposed on an upper portion of the first substrate, and in which an electro-optical converter outputting an optical signal to the first mirror, and a second mirror reflecting the optical signal reflected by and received from the first mirror to the optical coupling device are disposed.

According to another aspect of the present disclosure, a photonic integrated circuit package includes a first substrate in which a first mirror and an optical coupling device are disposed, and a second substrate disposed on an upper portion of the first substrate, and in which an electro-optical converter and a second mirror are disposed, wherein the first and second mirrors are disposed on opposite surfaces of the first and second substrates, respectively.

According to yet another aspect of the present disclosure, a photonic integrated circuit package includes a photonic integrated circuit board including a base substrate, a first insulating layer, an optical core layer having the optical coupling device disposed therein, and a second insulating layer, stacked in sequence, and a first concave mirror disposed by recessing at least the second insulating layer from an upper surface, and an optical bench assembled on the photonic integrated circuit board, and including an electro-optical converter, and a second concave mirror disposed by recessing a lower surface.

BRIEF DESCRIPTION OF THE DRAWINGS

Features will become apparent to those of skill in the art by describing in detail exemplary embodiments with reference to the attached drawings, in which.

DETAILED DESCRIPTION

The term "light" in this specification may be mainly used to describe the physical characteristics (e.g., reflection, etc.) of light, and the term optical signal may be mainly used to describe light containing a signal for data communications. However, the terms light and optical signals may have substantially the same concept, and may be mixed with each other.

Hereinafter, preferred embodiments of the present disclosure will be described with reference to the accompanying drawings.

Figure 1:
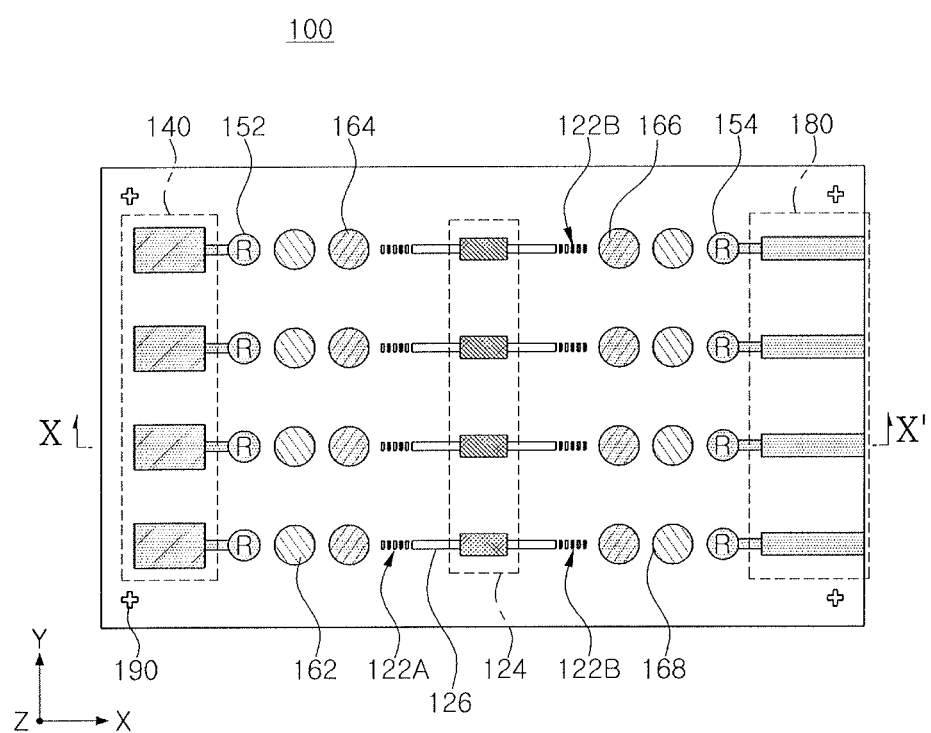
FIG. 1 illustrates a schematic layout diagram of a photonic integrated circuit package according to example embodiments.
Figure 2:
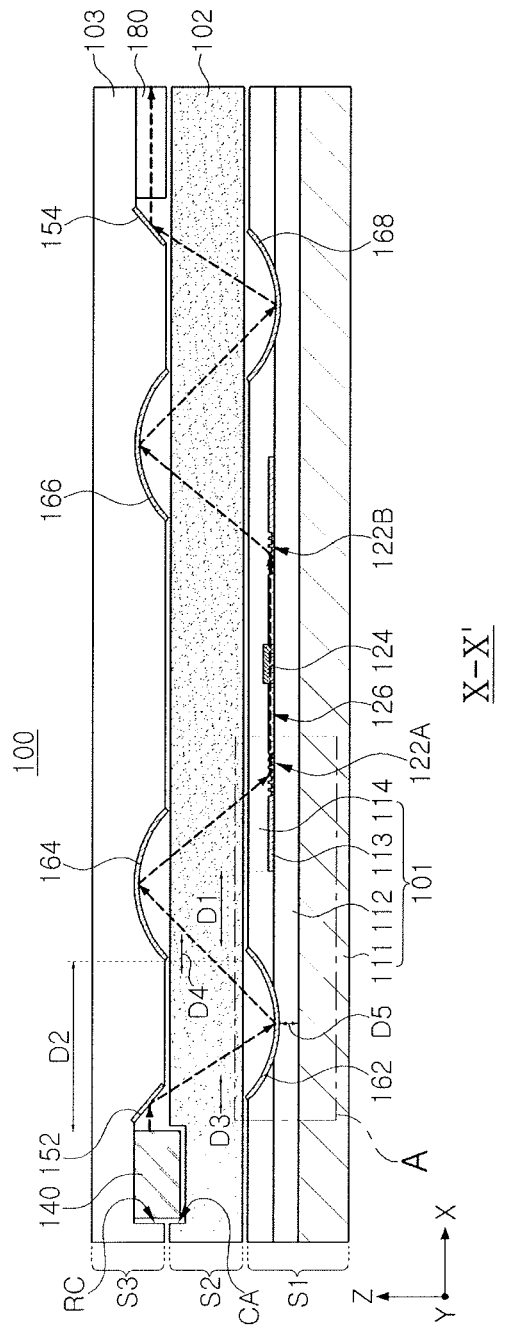
FIG. 2 illustrates a schematic cross-sectional view of a photonic integrated circuit package according to example embodiments.

FIG. 1 is a schematic layout diagram of a photonic integrated circuit package according to example embodiments. FIG. 2 is a schematic cross-sectional view of a photonic integrated circuit package according to example embodiments. FIG. 2 is a cross-sectional view taken along line X-X' in FIG. 1.

Referring to FIGS. 1 and 2, a photonic integrated circuit package 100 may include a first substrate S1 having a photonic integrated circuit substrate, a second transparent substrate S2 stacked on the first substrate S1, and a third substrate S3 stacked on the second substrate S2 and having a light source 140 disposed thereon. In FIG. 1, dot hatching may be additionally indicated for components disposed on the third substrate S3 to be distinguished from components disposed on the first substrate S1. The first to third substrates S1, S2 and S3 may be stacked in a vertical direction, e.g., along the z direction of FIG. 2. In addition, an adhesive layer or the like may be interposed between the first and second substrates S1 and S2 and between the second and third substrates S2 and S3 to bond the first to third substrates S1 to S3.

The first substrate S1 may include a body portion 101 having a base substrate 111, a first insulating layer 112, an optical core layer 113 on which optical devices are disposed, and a second insulating layer 114, stacked in sequence. Since optical devices may be disposed in the optical core layer 113, the first substrate S1 may correspond to a photonic integrated circuit substrate. The first substrate S1 may further include a first mirror 162 and a fourth mirror 168 disposed by recessing the first and second insulating layers 112 and 114, and may further include an alignment mark 190 disposed in at least one region. In the example embodiments, the first substrate S1 may be mounted on a package substrate or the like, and may exchange electric signals with the package substrate through a separate electrical signal transferring unit. In the example embodiments, an electric integrated circuit device transferring an electrical signal to an optical modulator 124 and/or a photo-detector may be further mounted in the first substrate S1.

The base substrate 111 and the optical core layer 113 may include a semiconductor material, such as a Group IV semiconductor, e.g., silicon, germanium or silicon-germanium. The base substrate 111 may be provided as a bulk wafer or an epitaxial layer, and the optical core layer 113 may also be provided as an epitaxial layer. The first and second insulating layers 112 and 114 may be made of an insulating material, e.g., silicon oxide. In particular, the second insulating layer 114 may be made of a material having a refractive index lower than that of the optical core layer 113. In an example embodiment, the base substrate 111, the first insulating layer 112, and the optical core layer 113 may constitute a silicon-on-insulator SOI substrate.

Various optical devices including optical coupling devices may be disposed in the optical core layer 113. For example, the optical core layer 113 may be provided with an optical waveguide 126, and first and second grating couplers 122A and 122B and the optical modulator 124, which are connected by the optical waveguide 126.

The first and second grating couplers 122A and 122B may be used for inputting and outputting light, respectively. The first and second grating couplers 122A and 122B may couple the light travelling in a horizontal direction in the first substrate S1, in a vertical direction upwardly, or in a direction tilted from the vertical direction at a predetermined angle. Accordingly, the first and second grating couplers 122A and 122B may correspond to optical coupling devices.

The optical modulator 124 may be positioned between the first and second grating couplers 122A and 122B, and may change intensity, phase, and the like of light to generate an optical signal. The optical modulator 124 may be, e.g., an electro-absorption modulator or an interferometric modulator. For example, the optical modulator 124 may be a Mach-Zehnder interferometric modulator that divides light into two or more paths, modulates a phase of the light in at least one of the paths, and modulates the light by using constructive and destructive interferences between the phase-modulated light and the non-phase-modulated light. The optical waveguide 126 may be disposed between and connect the first and second grating couplers 122A and 122B and the optical modulator 124, and may be a passage through which light travels. According to embodiments, a photo-electric converter, e.g., a photo-detector, a wavelength division multiplexing device, a wavelength division demultiplexing device, and the like, may be further disposed in the optical core layer 113 in a region not illustrated.

The first mirror 162 and the fourth mirror 168 may be one type of reflector. The first mirror 162 and the fourth mirror 168 may reflect an optical signal transferred from the third substrate S3, disposed on an upper portion, to the upper portion again, e.g., reflect the optical signal from one element on the third substrate S3 to a different element on the third substrate S3. For example, the first mirror 162 may reflect the optical signal transmitted from the light source 140 or a first reflector 152 of the third substrate S3 to a second mirror 164 of the third substrate S3 (dashed arrows in FIG. 2). The fourth mirror 168 may reflect an optical signal transmitted from a third mirror 166 of the third substrate S3 to an optical fiber 180 or a second reflector 154 of the third substrate S3.

The first mirror 162 and the fourth mirror 168 may be disposed in a region in which the first and second insulating layers 112 and 114 are recessed from the upper surface of the first substrate S1, and may then be concave mirrors, e.g., with respect to the first substrate S1. For example, as illustrated in FIG. 2, each of the first mirror 162 and the fourth mirror 168 may extend through an entire thickness of the second insulating layer 114 and through at least a portion of the first insulating layer 112. A thickness D5 of the first insulating layer 112 remaining on a lower portion of the first mirror 162, i.e., a distance from a lowermost point of the first mirror 162 to an uppermost surface of the base substrate 111, may be the same as or thicker than zero (0). Therefore, a central portion of the first mirror 162 may be located at the same or higher level than the uppermost surface of the base substrate 111. For example, when the first mirror 162 is disposed most deeply, the, e.g., lowermost point of the, first mirror 162 may be in contact with the, e.g., uppermost surface of the, base substrate 111. The arrangement of the fourth mirror 168 may be similar to that of the first mirror 162, and a description regarding the first mirror 162 may be applied in the same manner as above.

The first mirror 162 may be disposed to be spaced apart from the optical core layer 113 by a first distance D1 laterally, e.g., along the x direction. For example, as illustrated in FIG. 2, the first distance D1 may be measured between facing terminal edges of the first mirror 162 and of the optical core layer 113. The first distance D1 may be, e.g., several micrometers to tens of micrometers. In particular, the first mirror 162 may be disposed to be spaced apart from the optical coupling devices of the optical core layer 113, such as the first and second grating couplers 122A and 122B. The fourth mirror 168 may also be disposed to be spaced apart from the optical core layer 113 laterally, e.g., along the x direction. Diameters of the first mirror 162 and the fourth mirror 168 may be, e.g., in the range of about 50 μm to about 200 μm, but are not limited thereto. An arrangement of the first mirror 162 will be described in more detail below with reference to FIGS. 3A and 3B.

The first mirror 162 and the fourth mirror 168 may be composed of reflective layers disposed on recessed surfaces. The reflective layers may be disposed to include at least a recessed region in a plane, and may have a circular or rectangular shape. Alternatively, the reflective layers may be disposed to extend to all of the regions, except for the paths of the optical signal. The reflective layers may include a material having high reflectivity characteristics, and may include at least one of aluminum (Al), copper (Cu), gold (Au), or silver (Ag). A structure of a mirror including the first mirror 162 will be described in more detail below with reference to FIGS. 4A to 4C.

The alignment marks 190 may not only be disposed on the first substrate S1 but also on the third substrate S3, and may be disposed on surfaces facing each other, respectively. The alignment mark 190 may be used for improving alignment in a case in which the first substrate S1 and the third substrate S3 are bonded. For example, the first substrate S1 and the third substrate S3 may be aligned with each other by defining a position with a coordinate value expressed by distances from a center of the first mirror 162 using the alignment mark 190.

The second substrate S2 may be interposed between the first substrate S1 and the third substrate S3, and may be formed of a body portion 102 of a transparent material. The second substrate S2 may function to adjust a focal length between the first substrate S1 and the third substrate S3. The second substrate S2 may be disposed in contact with the first substrate S1 and the third substrate S3, and an adhesive layer may be interposed therebetween. The body portion 102 of the second substrate S2 may be made of a material capable of permeating the optical signal without loss, and may include, e.g., $SiO_2$, $SiN_x$, $SiON$, $Al_2O_3$, $HfO$, $TiO_2$ or $ZrO$. The second substrate S2 may have a cavity CA for accommodating a lower portion of the light source 140 mounted on the third substrate S3. The second substrate S2 may be omitted, depending on embodiments. In this case, a space between the first substrate S1 and the third substrate S3 may be filled with, e.g., air.

The third substrate S3 may be disposed to be optically aligned with the first substrate S1 with the second substrate S2 interposed therebetween. The third substrate S3 may include a body portion 103, the light source 140, the first reflector 152, the second mirror 164, the third mirror 166, the second reflector 154, and the optical fiber 180.

The light source 140 may output an optical signal to the first mirror 162 of the first substrate S1. The light source 140 may be an electro-optical converter, e.g., a laser diode (LD) or a light emitting diode (LED). The light source 140 may be mounted in a recessed region RC of the lower surface of the third substrate S3, e.g., the light source 140 may be mounted within a cavity defined by the recessed region RC of the third substrate S3 and the cavity CA of the second substrate S2. The light source 140 may be, e.g., flip-chip bonded to the third substrate S3, but is not limited thereto.

The first reflector 152 may change a traveling direction of an optical signal output from the light source 140 to the first substrate S1. The first reflector 152 may be a flat mirror, and may have a sloped surface. The first reflector 152 may include a high reflectivity reflective layer disposed on the sloped surface. The first reflector 152 may vertically overlap the first mirror 162 of the first substrate S1 by a predetermined distance D3, but is not limited thereto. For example, the first reflector 152 may be disposed to not overlap the first mirror 162 of the first substrate S1 on a plane.

The second and third mirrors 164 and 166 may be disposed by recessing the body portion 103 on the lower surface of the third substrate S3. For example, the first and fourth mirrors 162 and 168 of the first substrate S1 and the second and third mirrors 164 and 166 of the third substrate S3 may be disposed on surfaces facing each other, respectively. In particular, the second mirror 164 may be disposed to be spaced apart from the light source 140 by a second distance D2 laterally, e.g., along the x direction. The second mirror 164 may vertically overlap the first mirror 162 of the first substrate S1 by a predetermined distance D4, but is not limited thereto. For example, the second mirror 164 may be disposed so as not to overlap the first mirror 162 of the first substrate S1 on a plane. The second mirror 164 may be disposed such that at least a portion thereof overlaps the optical coupling device of the first substrate S1. When the first reflector 152, the first mirror 162, the second mirror 164, and the second grating coupler 122A are disposed in a partially overlapped manner in sequence, as described above, a degree of integration may be further improved.

The second and third mirrors 164 and 166 may be concave mirrors, e.g., with respect to the third substrate S3, and may be composed of a reflective layer disposed on recessed surface of the body portion 103. The reflective layer may include a material having high reflectivity characteristics, and may include at least one of aluminum (Al), copper (Cu), gold (Au), and silver (Ag). The description of the first and fourth mirrors 162 and 168 may be applied to the second and third mirrors 164 and 166 in the same manner as above. For example, as illustrated in FIG. 2, the second and third mirrors 164 and 166 may have curvatures in a same direction, which is opposite to the curvatures of the first and fourth mirrors 162 and 168.

The second reflector 154 may change a traveling direction of an optical signal transmitted from the fourth mirror 168 of the first substrate S1 to the optical fiber 180. The second reflector 154 may have a sloped surface, and may include a high reflectivity reflective layer disposed on the sloped surface.

The optical fiber 180 may output an optical signal received through the first substrate S1 to an external device, or may input an optical signal from the external device. The optical fiber 180 may be formed of a core layer, and a cladding material surrounding the core layer, but is not limited thereto.

An optical signal in the photonic integrated circuit package 100, e.g., the optical signal generated from the light source 140 of the third substrate S3 (e.g., see dashed arrow in FIG. 2), may be transferred to the optical core layer 113 in the first substrate S1 via the first and second mirrors 162 and 164. The first grating coupler 122A may transmit the received optical signal in a horizontal direction, e.g., in the x direction, through the optical waveguide 126 to the optical modulator 124. The optical modulator 124 may modulate and generate an optical signal based on an electric signal received from the electric integrated circuit device or the like in the first substrate S1. The generated optical signal may be transmitted to the third substrate S3, and may be output externally through an optical interface, e.g., the optical fiber 180, via the third and fourth mirrors 166 and 168. Therefore, an optical signal may travel and be transmitted through the stacked substrates in FIG. 1 with significantly reduced loss thereof, since the first to third substrates S1 to S3 are stacked on top of each other and the first to fourth mirrors 162, 164, 166, and 168 are mutually aligned.

As illustrated in FIG. 1, the light source 140 in the example embodiments may include a plurality of light sources emitting light of different wavelengths, and the optical modulator 124 may be also disposed in plural in an array form to change intensity, phase, and the like of light originated from the respective light sources 140. The first to fourth mirrors 162, 164, 166, and 168 may be disposed in plural to correspond to the array of each of the light sources 140 and the optical fibers 180.

A plurality of generated optical signals transferred from the plurality of light sources 140 to the plurality of optical modulators 124, respectively, may transmit data, information, and the like, which are different from each other. Also, the optical signals may be output through the plurality of optical fibers 180 without interfering with and overlapping each other. The number and arrangement of the light source 140, the optical modulator 124, the first to fourth mirrors 162, 164, 166, and 168, and the optical fiber 180 may be variously modified, according to embodiments.

Figure 3A:
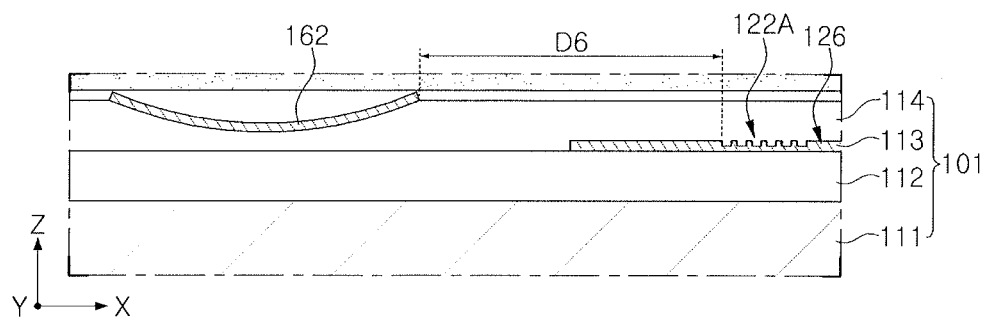
FIGS. 3A and 3B illustrate cross-sectional views of a portion of a photonic integrated circuit package according to example embodiments.
Figure 3B:
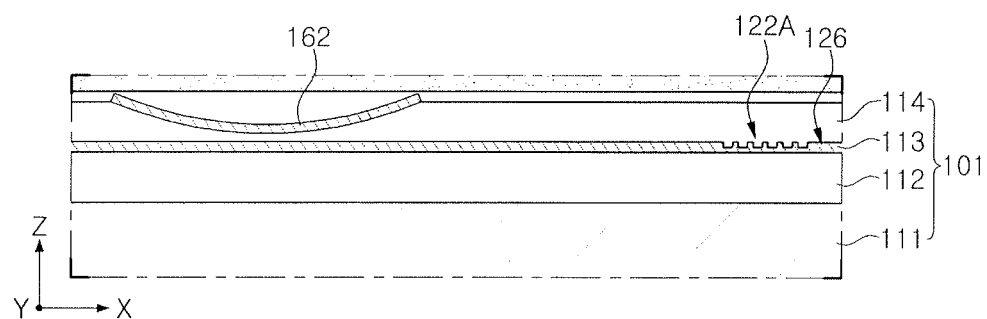

FIGS. 3A and 3B are cross-sectional views illustrating a portion of a photonic integrated circuit package according to example embodiments. FIGS. 3A and 3B illustrate regions corresponding to region 'A' in FIG. 2, respectively.

Referring to FIG. 3A, the first mirror 162 may be disposed by recessing only the second insulating layer 114 of the body portion 101 in the first substrate S1. In this case, the optical core layer 113 may not extend to the lower portion of the first mirror 162, and the first grating coupler 122A may be disposed to be spaced apart from the first mirror 162 by a predetermined distance D6.

Referring to FIG. 3B, the first mirror 162 may be disposed by recessing only the second insulating layer 114 of the body portion 101 in the first substrate S1, as in the embodiment of FIG. 3A, and the optical core layer 113 may extend to the lower portion of the first mirror 162. Therefore, the optical core layer 113 and the first mirror 162 may be disposed to overlap each other in at least one region. Even in this case, an optical coupling device such as the first grating coupler 122A may be disposed to be spaced apart from the first mirror 162. In a region of the optical core layer 113 extending to the lower portion of the first mirror 162, the optical coupling device may not be disposed. Only optical devices other than the optical coupling device may be disposed in the region, or the region may be a dummy optical core layer on which optical devices are not disposed.

Figure 4A:
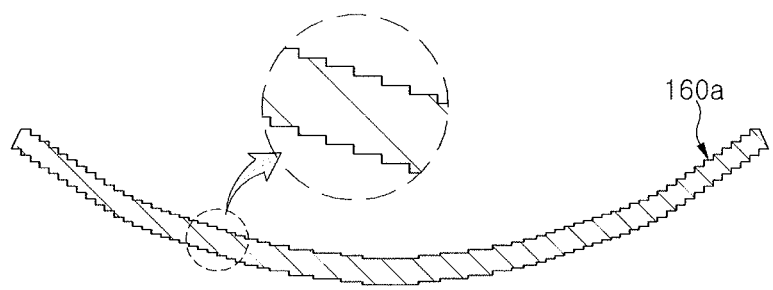
FIGS. 4A to 4C illustrate cross-sectional views of a mirror of a photonic integrated circuit package according to example embodiments.
Figure 4B:
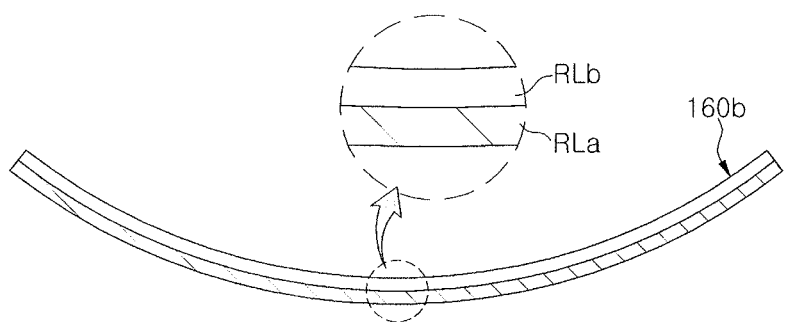
Figure 4C:
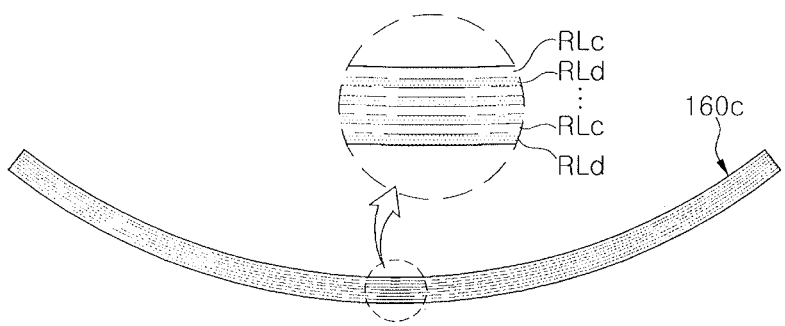

FIGS. 4A to 4C are cross-sectional views illustrating a mirror of a photonic integrated circuit package according to example embodiments. FIGS. 4A to 4C illustrate structures of mirrors 160a, 160b, and 160c that may be employed as the first to fourth mirrors 162, 164, 166, and 168 of FIG. 2.

Referring to FIG. 4A, the mirror 160a may have fine steps having a stairs shape on its surface. As illustrated in FIG. 4A, the mirror 160a may have steps on upper and lower surfaces thereof. The steps may have the same or different depths and angles on the upper and lower surfaces of the mirror 160a. When the steps are formed of a recessed region in the body portion 101 of the first substrate S1 or the body portion 103 of the third substrate S3, the steps may be formed by forming a mask layer using a grayscale lithography method and etching the same to form steps on the surfaces of the body portions 101 and 103, and by depositing a reflecting layer forming the mirror 160a along the steps.

Referring to FIG. 4B, the mirror 160b may include a metal layer RLa, and a dielectric layer RLb on the metal layer RLa. The dielectric layer RLb may be a layer that prevents oxidation of the metal layer RLa and protects the metal layer RLa. The dielectric layer RLb may be made of a dielectric material having a small optical loss with respect to light in a wavelength band to be reflected. The dielectric layer RLb may include, e.g., silicon oxide ($SiO_2$), silicon nitride ($Si_3N_4$), silicon oxynitride (SiON), high-k dielectric material, or combinations thereof.

Referring to FIG. 4C, the mirror 160c may include first and second Bragg layers RLc and RLd that have different refractive indices and that are alternately stacked. The first and second Bragg layers RLc and RLd may form a distributed Bragg reflector (DBR).

For example, the first Bragg layer RLc may include a low refractive index layer, and the second Bragg layer RLd may include a high refractive index layer. The first and second Bragg layers RLc and RLd may be made of a dielectric material. The first Bragg layer RLc may include any one of $SiO_2$ (refractive index: about 1.46), $Al_2O_3$ (refractive index: about 1.68), and MgO (refractive index: about 1.7). The second Bragg layer RLd may include any one of $TiO_2$ (refractive index: about 2.3), $Ta_2O_5$ (refractive index: about 1.8), ITO (refractive index: about 2.0), $ZrO_2$ (refractive index: about 2.05), and $Si_3N_4$ (refractive index: about 2.02). The first and second Bragg layers RLc and RLd may have the same or different thicknesses.

Figure 5:
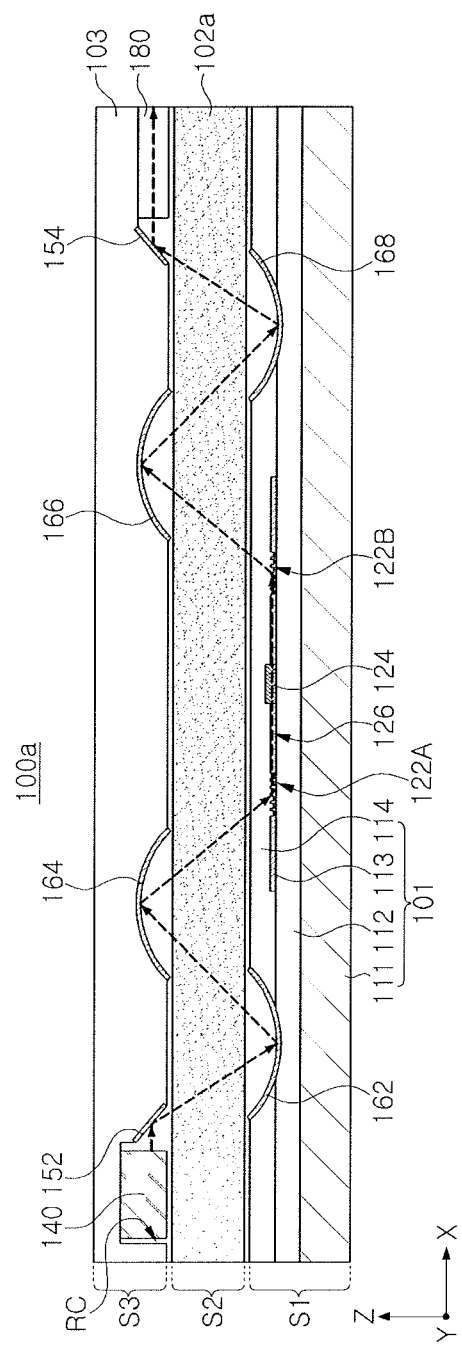
FIGS. 5 to 7 illustrate schematic cross-sectional views of a photonic integrated circuit package according to example embodiments.
Figure 6:
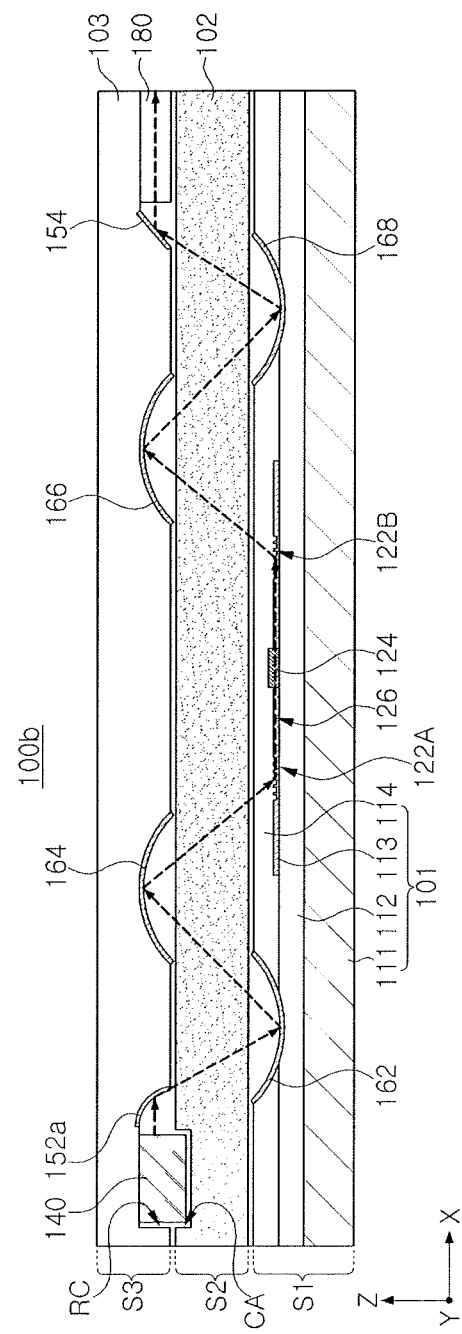
Figure 7:
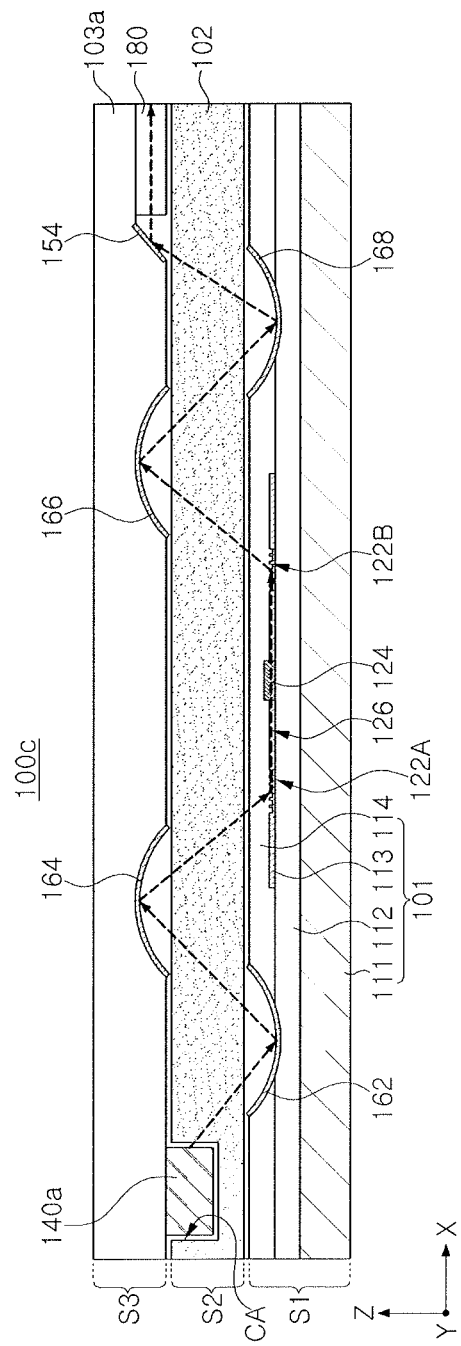

FIGS. 5 to 7 are schematic cross-sectional views of a photonic integrated circuit package according to example embodiments.

Referring to FIG. 5, in a photonic integrated circuit package 100a, the light source 140 may be mounted in the recessed region RC of the third substrate S3 such that a lower surface of the light source 140 is coplanar with a lower surface of the body portion 103, or is located on a level higher than a lower surface of the body portion 103. For example, the recessed region RC may be formed to be relatively deep, such that side surfaces of the light source 140 are completely surrounded by the body portion 103. Therefore, a body portion 102a of the second substrate S2 may not have the cavity CA, and may have a flat upper surface. As described above, in the embodiments, a mounting shape of the light source 140 and thus a size and a shape of the recessed region RC and the cavity CA may be variously changed.

Referring to FIG. 6, in a photonic integrated circuit package 100b, a first reflector 152a may have a curved shape. The curvature and arrangement of the first reflector 152a may be determined depending on a direction of an optical signal output from the light source 140, and a position of the first mirror 162 in a lower portion. In the example embodiments, the second reflector 154 disposed adjacent to the optical fiber 180 may also have a curved shape.

Referring to FIG. 7, in a photonic integrated circuit package 100c, a light source 140a may be mounted on a lower surface of the third substrate S3, e.g., to extend into the cavity CA of the second substrate S2. Also, in the photonic integrated circuit package 100c, a first reflector 152 may be omitted, unlike the embodiment of FIG. 2.

The light source 140a may be mounted on a lower surface of a body portion 103a of the third substrate S3. Therefore, the body portion 103a of the third substrate S3 may not have a recessed region RC (see FIG. 2), and the cavity CA of the body portion 102 of the second substrate S2 may be formed relatively deep.

An optical signal output from the light source 140a may be transmitted to the first mirror 162 without a reflector. The light source 140a may be, e.g., a vertical emitting laser diode or a vertical emitting diode. In this case, an optical signal output from the light source 140a may be transmitted vertically or at a tilted angle toward the lower first substrate S1.

As in the photonic integrated circuit packages 100a, 100b, and 100c described above, the light sources 140 and 140a may be disposed in the third substrate S3 in various forms, and first reflectors 152 and 152a disposed adjacently to the light sources 140 and 140a may have various shapes. Further, in the embodiments, the first reflectors 152 and 152a may be omitted depending on the light sources 140 and 140a.

Figure 8:
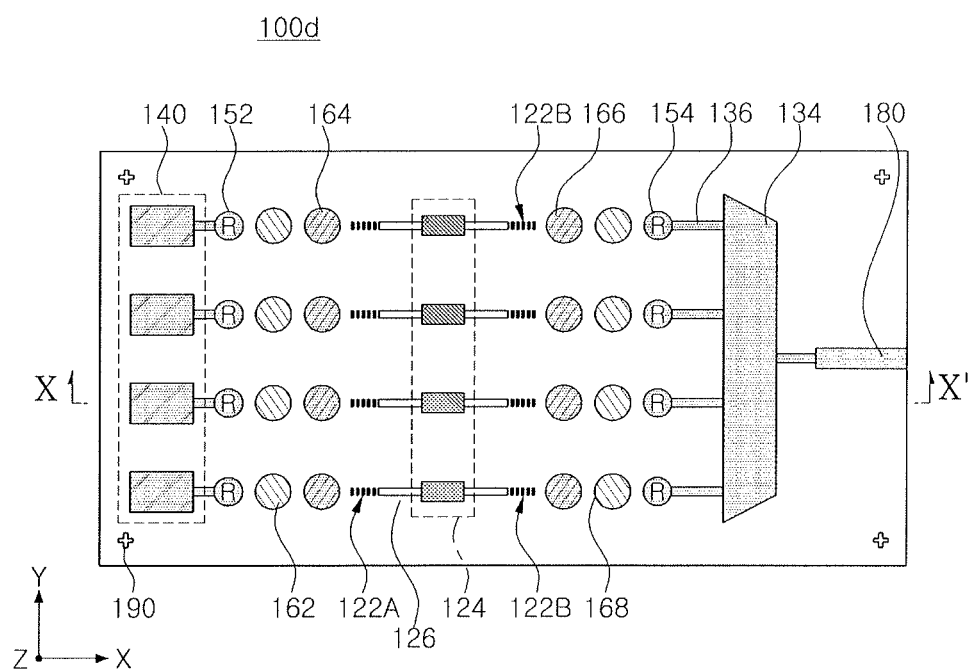
FIGS. 8 and 9 illustrate schematic plan and cross-sectional views of a photonic integrated circuit package according to example embodiments.
Figure 9:
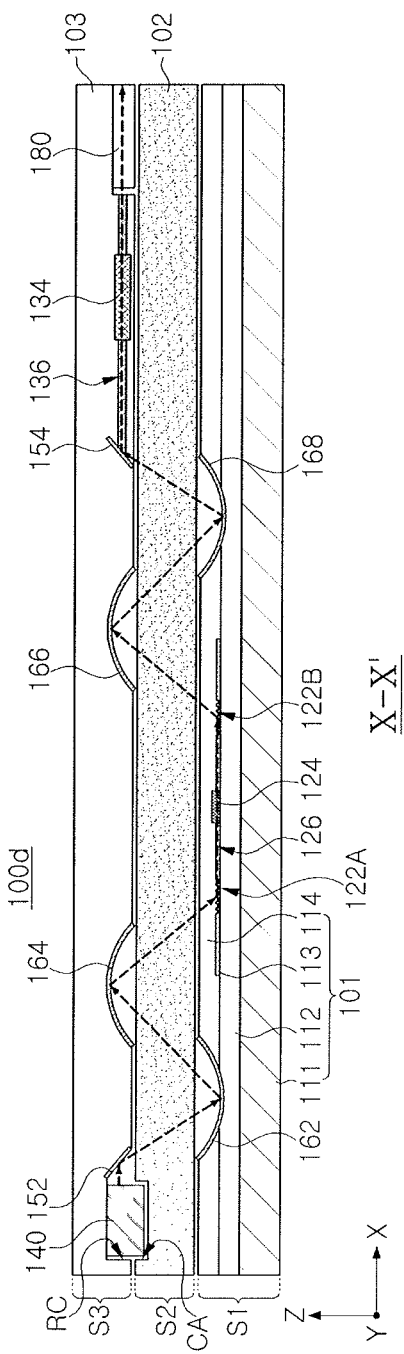

FIGS. 8 and 9 are schematic plan and cross-sectional views of a photonic integrated circuit package according to example embodiments. FIG. 9 illustrates a cross-section taken along line X-X' in FIG. 8.

Referring to FIGS. 8 and 9, in a photonic integrated circuit package 100d, the third substrate S3 may further include a wavelength division multiplexing (WDM) device 134, and an optical waveguide 136 connected to the WDM device 134, unlike the embodiment of FIGS. 1 and 2. The WDM device 134 and the optical waveguide 136 may be embedded in the body portion 103 of the third substrate S3, but are not limited thereto.

The WDM device 134 may receive optical signals of different wavelength bands, and generate a single output optical signal. For example, the WDM device 134 may function as a type of multiplexer. The output optical signal generated by the WDM device 134 may be transferred to the optical fiber 180 through the optical waveguide 136, and output through the optical fiber 180.

In particular, as illustrated in FIG. 8, in the photonic integrated circuit package 100d, optical signals of different wavelengths output from light sources 140 may be multiplexed on the third substrate S3 through first and second grating couplers 122A and 122B in the first substrate S1, optimized for each wavelengths. Therefore, compared with a case in which the WDM device 134 is disposed in the optical core layer 113 of the first substrate S1 such that optical signals are multiplexed and then transmitted to an optical fiber 180 through a single first and second grating couplers 122A and 122B, the first and second grating couplers 122A and 122B may be easily implemented, and loss of an optical signal in each wavelength band may be significantly reduced.

Figure 10:
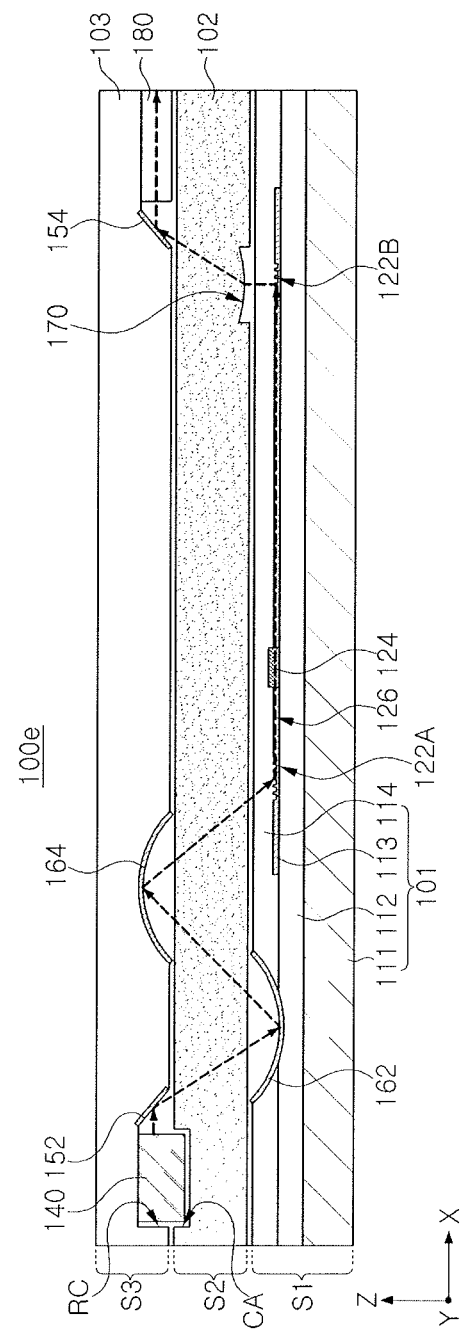
FIG. 10 illustrates a schematic cross-sectional view of a photonic integrated circuit package according to example embodiments.

FIG. 10 is a schematic cross-sectional view of a photonic integrated circuit package according to example embodiments.

Referring to FIG. 10, a photonic integrated circuit package 100e may further include a lens 170, and may not include third and fourth mirrors 166 and 168, unlike the embodiment of FIG. 2. The lens 170 may be formed on a lower surface of the body portion 102 of the second substrate S2 between the second grating coupler 122B and the second reflector 154. The lens 170 may be a convex lens. A focal distance between the second grating coupler 122B and the second reflector 154 may be secured by the lens 170.

In the example embodiments, lenses may be further disposed on an upper surface of the body portion 102 of the second substrate S2, and/or also on a lower surface of the body portion 103 of the third substrate S3. Also, even when the lens 170 is disposed, the third and fourth mirrors 166 and 168 of the embodiment of FIG. 2 may be disposed together. Like these embodiments, a structure for transmitting an optical signal from the first substrate S1 to an optical fiber 180 may be variously modified.

Figure 11:
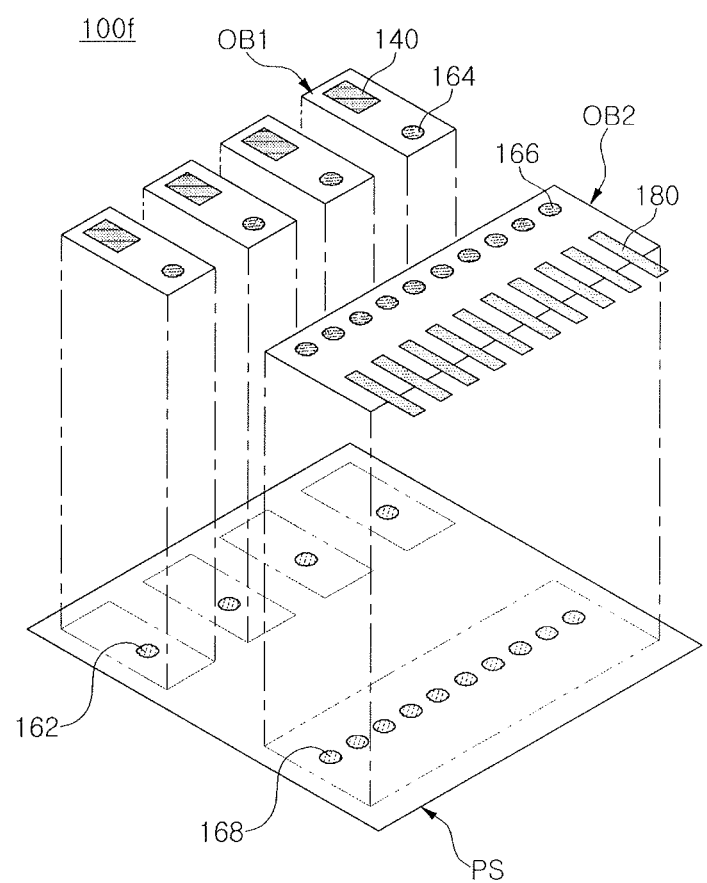
FIGS. 11 and 12 illustrate schematic exploded views of a photonic integrated circuit package according to example embodiments.
Figure 12:
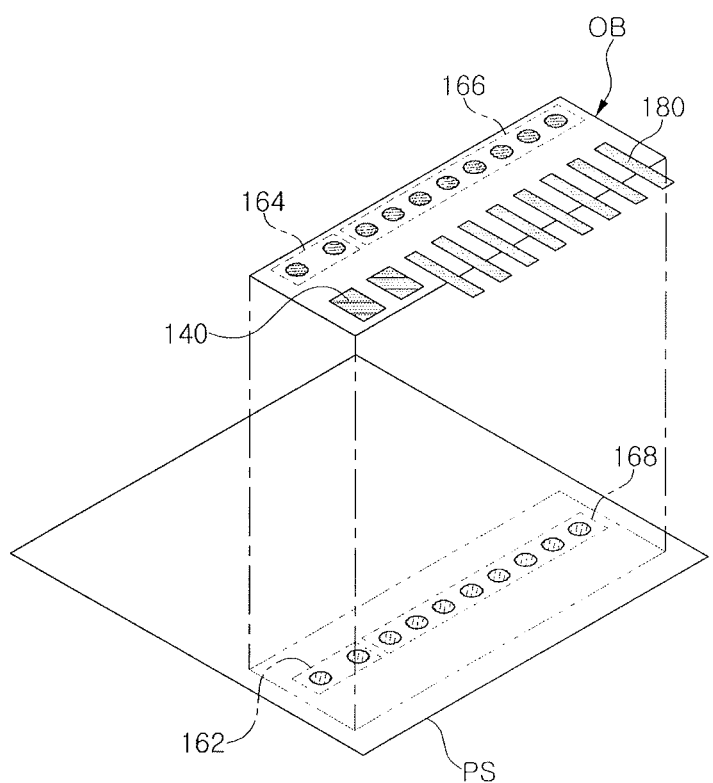

FIGS. 11 and 12 are schematic exploded views of a photonic integrated circuit package according to example embodiments. FIGS. 11 and 12 mainly illustrate components for optical connecting, so some elements, e.g., the optical devices disposed in the optical core layer 113 of FIG. 2, are not shown.

Referring to FIG. 11, a photonic integrated circuit package 100f may include a photonic integrated circuit substrate PS, and first and second optical benches OB1 and OB2 assembled on the photonic integrated circuit substrate PS. For example, the photonic integrated circuit substrate PS may correspond to the first substrate S1 described above with reference to FIG. 2. For example, the first optical bench OB1 may correspond to a region including the light source 140 and the second mirror 164 in the third substrate S3 of FIG. 2, and the second optical bench OB2 may correspond to a region including the third mirror 166 and the optical fiber 180 in the third substrate S3 of FIG. 2. In the photonic integrated circuit package 100f, the first optical bench OB1 and the second optical bench OB2 may be separately assembled on the photonic integrated circuit substrate PS, and may be spaced apart from each other.

The photonic integrated circuit substrate PS may include optical coupling devices, and may include first mirrors 162 and fourth mirrors 168 as structures for optical connecting with the first and second optical bench OB1 and OB2.

The first optical benches OB1 may include the light source 140 and the second mirror 164, respectively, and may be disposed on the photonic integrated circuit substrate PS in plural. However, a configuration of the light source 140 and the first optical bench OB1 is not limited thereto. For example, only one first optical bench OB1 may be disposed, and a plurality of light sources 140 may constitute the first optical bench OB1. Optical signals output from the light sources 140 in the first optical bench OB1 may be transmitted to the photonic integrated circuit substrate PS, and then reflected by the first mirrors 162, and transmitted to the photonic integrated circuit substrate PS again through the second mirrors 164.

The second optical bench OB2 may include third mirrors 166 and optical fibers 180. The second optical bench OB2 may be disposed on the photonic integrated circuit substrate PS separately from the first optical bench OB1. Therefore, it can be understood that, in a specific structure, e.g., the third substrate S3 described above with reference to FIG. 2, may be divided into two substrates. The first and second optical benches OB1 and OB2 may be referred to as a kind of substrate which is distinguished from the photonic integrated circuit substrate PS. However, in the embodiments, the second optical bench OB2 may be modified to have various structures, as long as the second optical bench OB2 includes the optical fibers 180.

Referring to FIG. 12, a photonic integrated circuit package 100g may include the photonic integrated circuit substrate PS, and an optical bench OB assembled on the photonic integrated circuit substrate PS. For example, the photonic integrated circuit substrate PS may correspond to the first substrate S1 described above with reference to FIG. 2. In another example, the optical bench OB may correspond to the third substrate S3 in FIG. 2. In the photonic integrated circuit package 100g, the light sources 140 and optical fibers 180 may be included in a single optical bench OB, and may be assembled on the photonic integrated circuit substrate PS.

The photonic integrated circuit substrate PS may include optical coupling devices, and may include first mirrors 162 and fourth mirrors 168 as structures for optical connecting with the optical bench OB. The optical bench OB may include at least one light source 140, at least one second mirror 164, third mirrors 166, and optical fibers 180. An arrangement of the light source 140 and the optical fibers 180 in the optical bench OB may be variously changed.

Figure 13:
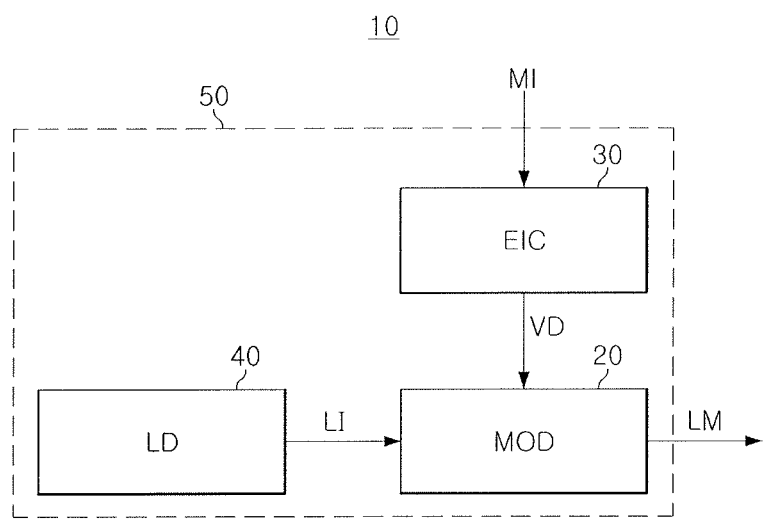
FIG. 13 illustrates a schematic block diagram of a photonic integrated circuit package according to example embodiments.

FIG. 13 is a schematic block diagram of a photonic integrated circuit package according to example embodiments.

Referring to FIG. 13, a photonic integrated circuit package 10 may be an optical communication device for transmitting and receiving an optical signal, and may include a photonic integrated circuit 50. The photonic integrated circuit 50 may include an electric integrated circuit (EIC) device 30, an electro-optical converter 40, and an optical modulator (MOD) 20. The photonic integrated circuit 50 may further include an active optical device such as a photo-detector, a WDM device, and the like, and/or a passive optical device, e.g., an optical waveguide, a grating coupler, a reflector, and the like. The photonic integrated circuit package 10 may further include an optical interface, e.g., an optical fiber array.

The EIC device 30 may generate transmitting electric signals VD based on applied transmission data MI. The optical modulator 20 may modulate an optical signal LI received from the electro-optical converter 40, e.g., a laser diode (LD), according to the transmitting electrical signals VD to generate a modulated optical signal LM. The modulated optical signal LM may be transferred to an external device, a printed circuit board, or the like.

The EIC devices 30, the electro-optical converter 40, and the optical modulator 20, constituting the photonic integrated circuit 50, may be disposed on one substrate, e.g., on the first substrate S1 of FIG. 2, but are not limited thereto. For example, the EIC device 30 may be disposed on a different substrate from the other components. According to the embodiments, an optical transmitter including the electro-optical converter 40 and an optical receiver including a photo-detector may be separated from each other to form respective photonic integrated circuits.

Figure 14:
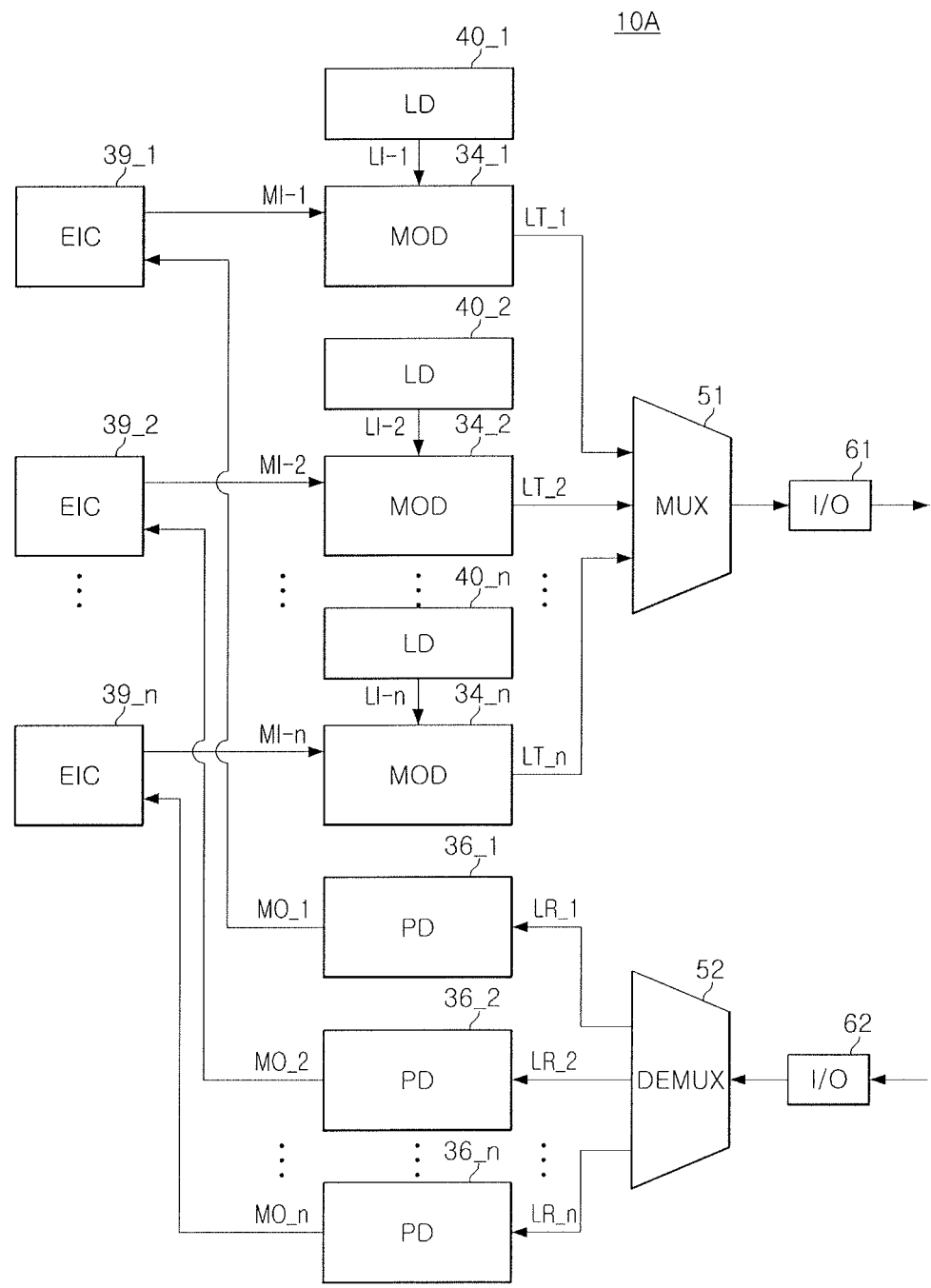
FIG. 14 illustrates a diagram of a photonic integrated circuit system including a photonic integrated circuit package according to example embodiments.

FIG. 14 is a diagram illustrating a photonic integrated circuit system including a photonic integrated circuit package according to example embodiments.

Referring to FIG. 14, a photonic integrated circuit system 10A may include the photonic integrated circuit package described above with reference to FIGS. 1 to 13. The photonic integrated circuit system 10A may include a plurality of EIC devices 39_1 to 39_n, a plurality of optical modulators 34_1 to 34_n, a plurality of electro-optical converters 40_1 to 40_n, a plurality of photo-electric converters 36_1 to 36_n, alignment devices 51 and 52, and receptacle connectors 61 and 62.

The alignment devices 51 and 52 may include an optical signal multiplexer 51 and an optical signal demultiplexer 52. The plurality of optical modulators 34_1 to 34_n may generate optical transmission signals LT_1 to LT_n, respectively, by modulating input optical signals LI_1 to LI_n received from the electro-optical converters 40_1 to 40_n, on the basis of input electrical signals MI_1 to MI_n received from the plurality of EIC devices 39_1 to 39_n. At this time, the input optical signals LI_1 to LI_n and optical transmission signals LT_1 to LT_n, which are modulated, may be optical signals having different wavelengths, respectively.

The optical signal multiplexer 51 included in the alignment devices 51 and 52 may generate a multiplexed optical signal using the optical transmission signals LT_1 to LT_n, and may transmit the multiplexed optical signal through receptacle connectors 61 and 62 to an external device or a package circuit board.

The multiplexed optical signal transmitted from the external device via the receptacle connectors 61 and 62 may be provided to the optical signal demultiplexer 52 included in the alignment devices 51 and 52. The optical signal demultiplexer 52 may demultiplex the multiplexed optical signals input from the receptacle connectors 61 and 62 into optical reception signals LR_1 to LR_n, which are modulated. At this time, each of the optical reception signals LR_1 to LR_n may be optical signals having different wavelengths.

The plurality of photo-electric converters 36_1 to 36_n may generate output electric signals MO_1 to MO_n modulated based on the optical reception signals LR_1 to LR_n, respectively, and may provide these for a plurality of electric integrated circuit devices 39_1 to 39_n.

By way of summation and review, an aspect of the present disclosure is to provide a photonic integrated circuit package improved in terms of consistency and integration. That is, by disposing, e.g., concave, mirrors on the photonic integrated circuit substrate and on an upper substrate with a light source, a photonic integrated circuit package with improved consistency and integration may be provided. On the photonic integrated circuit substrate, the concave mirrors may be integrated in a form of recessing a portion of an insulating layer. On the upper substrate, the concave mirrors may be disposed on a lower surface thereof. An optical signal from the light source may be transmitted to the mirror of the PIC substrate by a reflector or the like, may be transmitted back to the mirror of the upper substrate, and may then be transmitted to a coupling device of the photonic integrated circuit substrate.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A photonic integrated circuit package, comprising:
   a first substrate including a first mirror and a grating coupler spaced apart from each other; and
   a second substrate on an upper portion of the first substrate, the second substrate including a light source, a second mirror, and an optical fiber, the light source to output an optical signal to the first mirror, the second mirror to reflect the optical signal reflected by and received from the first mirror to the grating coupler, and the optical fiber to receive the optical signal from the grating coupler,
   wherein the light source is in a recessed region of a lower surface of the second substrate.

2. The photonic integrated circuit package as claimed in claim 1, wherein the first and second mirrors are on opposite surfaces of the first and second substrates, respectively.

3. The photonic integrated circuit package as claimed in claim 1, wherein the first and second mirrors are concave mirrors in recessed surfaces of the first and second substrates, respectively.

4. The photonic integrated circuit package as claimed in claim 1, wherein at least a portion of the first mirror and at least a portion of the second mirror vertically overlap each other.

5. The photonic integrated circuit package as claimed in claim 1, wherein at least a portion of the second mirror and at least a portion of the grating coupler vertically overlap each other.

6. The photonic integrated circuit package as claimed in claim 1, wherein the second substrate further includes a reflector adjacent to the light source, the reflector to reflect the optical signal received from the light source to the first mirror.

7. The photonic integrated circuit package as claimed in claim 1, further comprising a third substrate between the first substrate and the second substrate, the third substrate including a transparent material.

8. The photonic integrated circuit package as claimed in claim 7, wherein the third substrate has a cavity for accommodating at least a portion of the light source.

9. The photonic integrated circuit package as claimed in claim 7, wherein the third substrate is in contact with the first and second substrates.

10. The photonic integrated circuit package as claimed in claim 1, wherein the first substrate further includes:
   a base substrate;
   a first insulating layer on the base substrate;
   an optical core layer on the first insulating layer, the grating coupler being in the optical core layer; and
   a second insulating layer stacked on the optical core layer, the first mirror being positioned in a recessed portion of the second insulating layer.

11. The photonic integrated circuit package as claimed in claim 10, wherein the first mirror is positioned in a recessed portion of the second insulating layer and the first insulating layer.

12. The photonic integrated circuit package as claimed in claim 10, wherein an end portion of the optical core layer is spaced apart from the first mirror.

13. The photonic integrated circuit package as claimed in claim 1, wherein the second substrate includes a third mirror to reflect the optical signal received from the grating coupler to the first substrate, and the first substrate further includes a fourth mirror to reflect the optical signal reflected by the third mirror toward the optical fiber.

14. A photonic integrated circuit package, comprising:
   a first substrate including a first mirror and a grating coupler; and
   a second substrate on an upper portion of the first substrate, the second substrate including a light source, a second mirror, and an optical fiber,
   wherein the first and second mirrors are on opposite surfaces of the first and second substrates, respectively, and
   wherein the light source is in a recessed region of a lower surface of the second substrate.

15. The photonic integrated circuit package as claimed in claim 14, wherein an optical signal output from the light source travels to the first mirror, is reflected by the first mirror to travel to the second mirror, and is reflected by the second mirror to be transmitted to the grating coupler.

16. The photonic integrated circuit package as claimed in claim 14, wherein the first and second mirrors are in recessed portions of an upper surface of the first substrate and the lower surface of the second substrate, respectively.

17. A photonic integrated circuit package, comprising:
   a photonic integrated circuit substrate including a base substrate, a first insulating layer, an optical core layer with a grating coupler, and a second insulating layer, stacked in sequence;
   a first concave mirror in a recessed portion of an upper surface of the second insulating layer; and
   an optical bench on the photonic integrated circuit substrate, the optical bench including a light source in a recessed region of a lower surface of the optical bench, an optical fiber, and a second concave mirror in a recessed portion of the lower surface of the optical bench.

18. The photonic integrated circuit package as claimed in claim 17, wherein the optical fiber is directly on the optical bench.

19. The photonic integrated circuit package as claimed in claim 18, wherein the optical fiber and the light source are in recesses on a same surface of the optical bench.

* * * * *